Aug. 30, 1955 — H. BENJAMIN — 2,716,292
CRYSTALLINE STRUCTURE DEMONSTRATION DEVICE
Filed Aug. 15, 1952
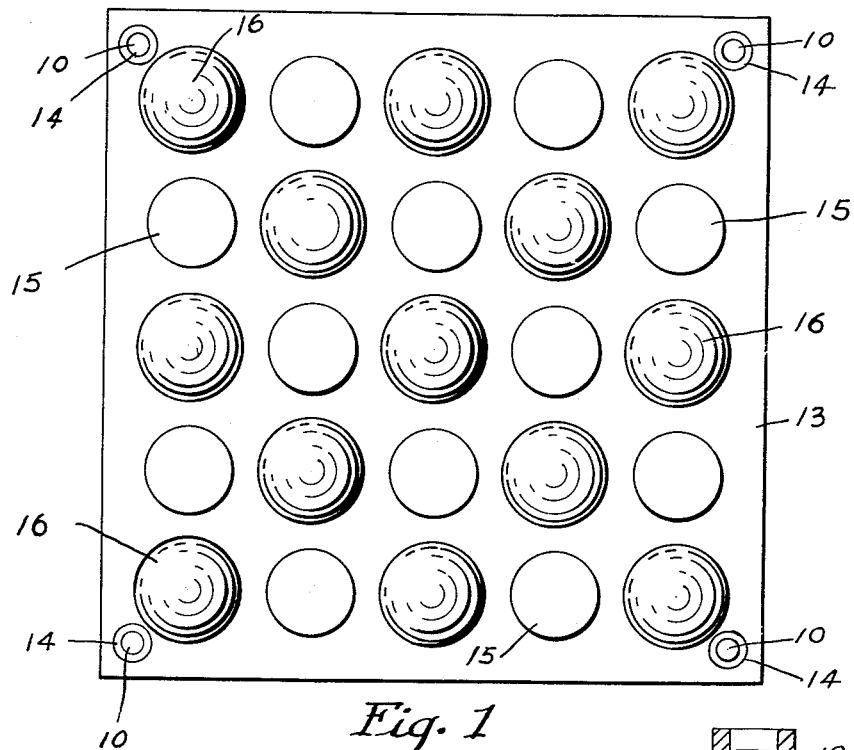
Fig. 1
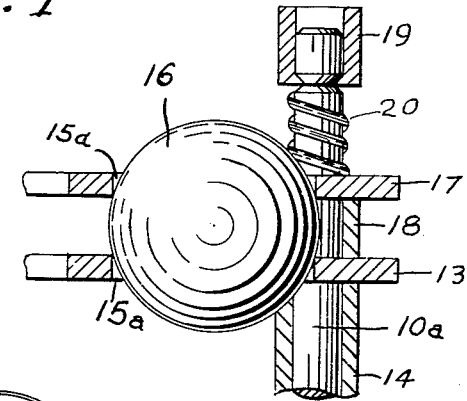
Fig. 5
Fig. 3
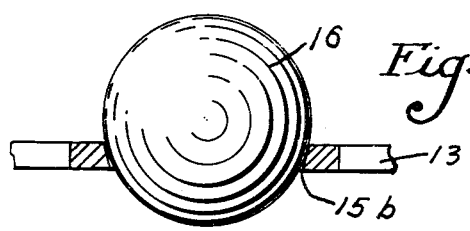
Fig. 4
INVENTOR.
Harry Benjamin.
BY
William H. Brown
Atty Aug. 30, 1955     H. BENJAMIN     2,716,292

CRYSTALLINE STRUCTURE DEMONSTRATION DEVICE

Filed Aug. 15, 1952     3 Sheets-Sheet 2

INVENTOR.
Harry Benjamin
BY
William H. Brown

INVENTOR.
Harry Benjamin
BY
William H Brown

United States Patent Office 2,716,292
Patented Aug. 30, 1955

2,716,292

CRYSTALLINE STRUCTURE DEMONSTRATION DEVICE

Harry Benjamin, Cleveland, Ohio, assignor to The Harshaw Chemical Company, Elyria, Ohio, a corporation of Ohio Application August 15, 1952, Serial No. 304,551

7 Claims. (Cl. 35—19)

This invention relates to representation of crystal structure and especially to devices adapted to facilitate such representation.

Prior to the present invention various devices have been used for representing the arrangements of atoms in various crystalline materials, usually consisting of balls of different colors provided with openings for the reception of wooden or metallic rods, the number of holes drilled in the colored balls and the location thereof being chosen to correspond with various atomic or ionic arrangements to be represented. Such devices, although effective, are not entirely satisfactory in that the joints tend to become insecure with continued use and the effort involved in building up a model is considerable.

It is an object of the present invention to provide devices for representing the arrangements of atoms, ions, or molecules in various materials which afford greater facility in the building up of models and which have little or no tendency to become insecure with continued use. A further object is to provide devices of a character indicated for representing crystal structure in three dimensions and comprising transparent plates having numerous openings, arranged in geometric patterns, for receiving bodies representing atoms, ions, or molecules and means for supporting such plates in regularly spaced relation such as to facilitate the arrangement of such bodies in such openings in regular geometric patterns in three dimensions. It will be understood that the openings in the plates will be of a size to position the bodies which represent atoms, ions, or molecules but too small to permit such bodies to pass completely therethrough under the influence of gravity. A further object is to provide a knock-down device of the character indicated which can be readily assembled and disassembled and to provide for distribution to users a package containing the parts from which such devices may be put together, it being understood that in the case of the objects representative of atoms, ions, or molecules there may be provided in such a package more of such bodies than will be used at any one time, likewise in the case of spacers for such transparent plates. Indeed, any of the parts may be supplied in quantities over and above what will be needed for any one demonstration. A further object is to provide certain of said plates with means permitting them or any one of them to be assembled in any one of a plurality of positions with respect to other plates. For example, one or more of the plates may be provided with two or more sets of openings adapted to receive each post of a set of four corner posts used in assembling the device. If square plates are to be used and a post is to be provided at each corner, each plate or some of the plates may be provided with two sets of four openings, each set adapted to be received over the corner posts and providing for each plate to occupy two positions with respect to the corner posts. It can be seen that by this means it becomes possible to demonstrate more atomic, ionic or molecular arrangements than could be done if each plate could occupy only one position with respect to the corner posts. Even better, the plates may be provided with slots or some of the plates may be provided with slots so that even after the device is assembled one or more of the plates may be shifted from one position to another thereby making it effective for representation of a greater number of structures.

A further object is to provide improved means for causing bodies representative of atoms, ions, or molecules to be held in fixed relation to the plates whereby to permit the device to be inverted or moved to any position without separation of its parts under the influence of gravity.

Referring now to the drawings, the various parts of the devices will be repreesnted by suitable reference characters and their various functions will be pointed out.

Fig. 1 is a top plan view of one embodiment of the invention.

Fig. 3 is a fragmentary sectional elevation showing a modified form of the invention.

Fig. 4 is a fragmentary sectional elevation of another modified form of the invention.

Fig. 5 is a fragmentary sectional elevation of another modified form of the invention.

Figure 2:
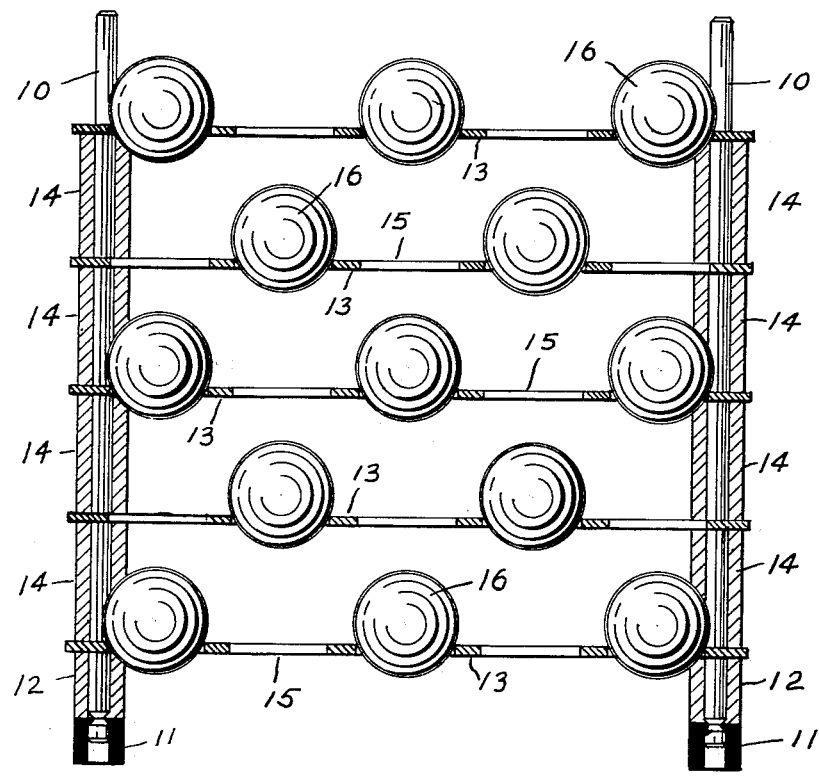
Fig. 2 is a sectional elevation of the embodiment of the invention shown in Fig. 1.

Referring now to the form of the invention illustrated in Figs. 1 and 2, the numeral 10 represents corner posts which may be provided with feet 11 composed of rubber or polyethylene or other plastic or other deformable material adapted to be forced into place and having an internal rib adapted to engage in a groove in said post 10 whereby to be held in place. Such a connection permits the feet to be easily attached or detached. It will be understood that the lower ends of the posts 10 may be threaded and internally threaded feet may be received thereon. In this latter case the feet will not need to be made of deformable material but may be made of metal, rubber, plastic or any other suitable material, rigid or deformable. Received on the posts 10 by means of suitable openings are sleeves 12 which may be of any length suitable for spacing the first plate to a suitable height above a table top or other supporting surface. Received on the posts 10 are a number of plates 13, which of course are provided with openings at the corner receiving such posts and a series of spacing sleeves 14 interposed between successive plates 13. In addition to the openings in the plates 13 which receive the posts 10 there are a number of openings 15 arranged in geometric pattern and some or all of which receive spheres 16 which may be of the same or different colors and which spheres are used for the purpose of representing atoms, ions, or molecules. It will be understood that the openings 15 may be arranged in any suitable geometric pattern and that the lengths of the sleeves 14 will be such as may be necessary to position the plates at such vertical heights as to yield the desired three dimensional patterns. It will be seen that the spheres 16 are of somewhat larger diameter than the openings 15 so that they are supported between plates and positioned in desirable geometric relation in three dimensions. In this embodiment of the invention reliance is had on the force of gravity to hold the spheres in position and also to hold the plates, sleeves and posts in fixed relationship to each other.

In Fig. 3 there is shown a structure which varies from that of Fig. 1 in that there are provided in addition to the plates 13 auxiliary plates 17 separated from the plates 13 by relatively short spacers 18. The plates 17 are identical with the plates 13 but have their openings 15a received over the upper portions of the spheres 16. The upper end of the posts 10a are provided with means for holding the plates and sleeves in fixed relation. This means may take the form of caps 19 of construction similar to the feet 11 of Fig. 2 having inner ribs engaging in grooves in posts 10a. It will be understood that other holding means such as an internally threaded nut received on an externally threaded portion of the posts 10 may be employed. The spring 20 may be omitted or replaced by a sleeve of suitable length similar to the sleeve 18.

In Fig. 4 there is indicated in a fragmentary fashion a tapered opening 15b which is of a diameter close to the diameter of the sphere 16. In this instance, the sphere may be of glass or other rigid material and the plate 13 may be of ethyl acetate plastic which can be very slightly stretched. As the diameter of the sphere approaches the diameter of the opening 15b, it becomes possible to wedge the sphere into the opening 15b to a sufficient extent to hold the sphere to a sufficient degree that it does not become dislodged without the application of considerable force. If this type of plate with rigid spheres is used, it is desirable to hold the plates and posts and sleeves in assembled relation by a spring and cap structure such as shown in Fig. 3 or by means of sleeves and threaded caps on the upper end of the posts.

In Fig. 5 there is illustrated a generally spherical body 16c which is provided with a groove 21 adapted to receive the plate 13. It will be understood that in this instance the sphere 16c will be composed of readily deformable material such as, for example, sponge rubber. Such a variation would have the advantages of the modification of Fig. 3 without doubling the number of plates. The cost of making the sphere might, however, be greater so that each modification might be best suited to various sizes and qualities of the device.

Figure 6:
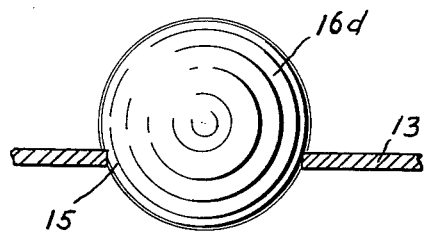
Fig. 6 is a fragmentary sectional elevation of a further modified form of the invention.

In Fig. 6 I have represented a modification wherein the plate 13 would receive a readily deformable sphere 16d which might be composed of sponge rubber and which could be easily pushed into the opening 15 to a degree sufficient to hold it against dislodgement under the action of gravity.

Figures 7, 8:
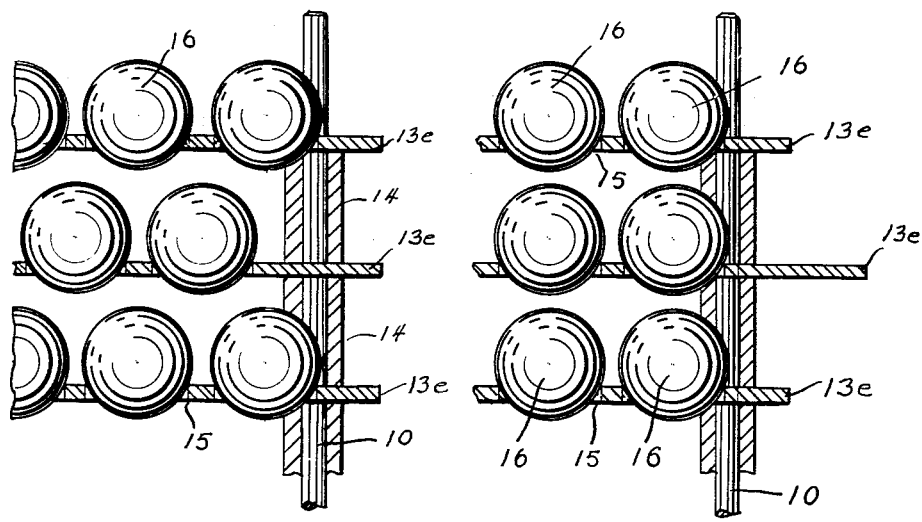
Fig. 7 is a fragmentary sectional elevation of yet another modified form of the invention showing the plates in such position that the spheres assume a hexagonal arrangement in elevation.
Fig. 8 is a similar view of the same embodiment of the invention as shown in Fig. 7 but showing one of the plates shifted to a position adapted to represent a sodium chloride type arrangement in elevation.
Figure 9:
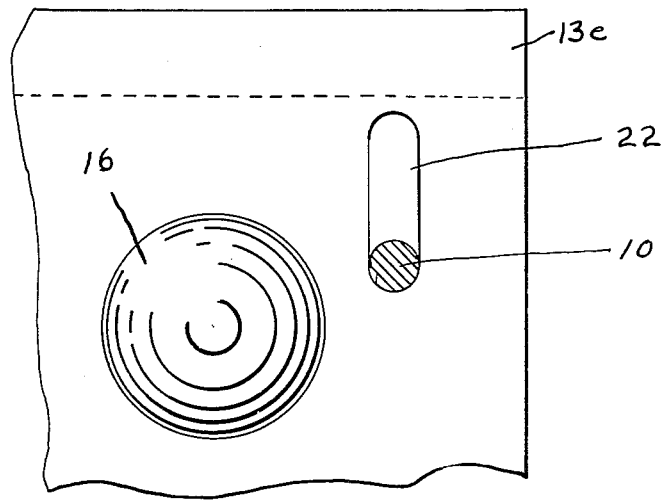
Fig. 9 is a fragmentary top plan view of the modification of the invention shown in Figs. 7 and 8 wherein is indicated a slot permitting the shifting of one of the plates between positions shown in Figs. 7 and 8.

Referring now to Figs. 7–9, I have shown a structure essentially similar to that of Figs. 1 and 2, including the posts 10, plates 13e, sleeves 14 and sphere 16 received in openings 15. The plates 13e, or one or more thereof, are provided with slots 22 receiving the posts 10 and permitting the plates 13e or some of them to be moved to a different position, for example, such as shown in Fig. 8 wherein the middle plate 13e is shown as moved to the right a distance to change the arrangement of spheres from a hexagonal arrangement to a cubic arrangement.

From the foregoing it will be seen that I have provided a device of the character indicated which is simple, cheap, and versatile, permitting numerous arrangements of the spheres whereby the user will be able to represent various molecular structures in all of which the bodies representative of atoms will be readily visible. While I have shown and described certain illustrative forms which the invention may take, it is to be understood, as has been indicated above, that other embodiments are possible. Accordingly, I desire to be limited only in accordance with the appended claims.

Having described the invention, what I claim is:

1. In a device used for representing crystal structure in three dimensions, a plurality of not less than three transparent plates, each having a plurality of openings formed therein and arranged in spaced relation to each other according to a regular geometric pattern of a type capable of indefinite extension with uniform distance between centers when measured in the same direction, means for supporting such plates in spaced relation to each other such that said openings in said plates are arranged in said type of geometric pattern in three dimensions and a plurality of bodies, too large to pass through said openings, received in at least some of said openings in said plates in said type of regular geometric pattern in three dimensions and said bodies being supported and held in such position by said plates, said openings being slightly smaller than the maximum girth of said bodies whereby the latter may rest therein with a major portion of their lower halves projecting through said plates.

2. In a device used for representing crystal structure in three dimensions, a plurality of not less than three transparent plates, each having a plurality of circular openings formed therein and arranged in spaced relation to each other according to a regular geometric pattern of a type capable of indefinite extension with uniform distances between centers when measured in the same direction, means for supporting such plates in spaced relation to each other such that said openings in said plates are arranged in said type of geometric pattern in three dimensions and spherical bodies adapted to be received in said openings and having maximum diameters somewhat larger than said openings and said bodies being of such respective diameters as to locate the centers of the latter approximately in planes parallel to said plates and closely adjacent thereto.

3. In a device used for representing crystal structure in three dimensions, a plurality of not less than three transparent plates having a plurality of circular openings formed therein and arranged in spaced relation to each other according to a regular geometric pattern of a type capable of indefinite extension with uniform distances between centers when measured in the same direction, means including posts passing through said plates and sleeves received on said posts and interposed between said plates for supporting such plates in spaced relation to each other such that said openings in said plates are arranged in said type of geometric pattern in three dimensions and a plurality of substantially spherical bodies, too large to pass through said openings, representative of structural elements of matter received in at least some of said openings in said plates in said type of regular geometric pattern in three dimensions and said bodies being supported and held in such position by said plates, said openings and said bodies being of such diameters as to locate the centers of the latter approximately in planes parallel to said plates and closely adjacent thereto.

4. A combination in accordance with claim 2 wherein a plurality of said plates are provided with means whereby they may be shifted from one to another of a plurality of positions with respect to the other of said plates in which said positions said openings form with the openings in said other plates different regular geometric arrangements in three dimensions.

5. A device as defined in claim 2 wherein said bodies are of substantially spherical shape and composed of readily deformable material and are of a size larger than said openings in said plates whereby they may be forced into said openings to an extent to be gripped therein and held against displacement when the entire device is moved to such a position that gravity would normally cause displacement.

6. A device as defined in claim 2 wherein said bodies are composed of readily deformable material and are spherical and provided with grooves adapted to receive said plates when such bodies are placed in the openings therein whereby such bodies may be held against displacement by gravity, said openings in said plates being circular and said bodies having diameters at said grooves not greater than the diameters of said openings but having maximum diameters greater than the diameters of said openings.

7. A device as defined in claim 2 wherein said bodies are substantially spherical and said plates are provided with circular openings of diameter slightly less than the diameter of said bodies and wherein alternate said plates are placed one above and one below a plurality of said bodies in relation to hold the latter against displacement irrespective of position of said device.

References Cited in the file of this patent
UNITED STATES PATENTS

| | | |
|---|---|---|
| 2,467,781 | Ribbe | Apr. 19, 1949 |
| 2,523,508 | Ledgett | Sept. 26, 1950 |